United States Patent
Oshima et al.

(10) Patent No.: US 10,144,257 B2
(45) Date of Patent: Dec. 4, 2018

(54) AMPHIBIOUS VEHICLE AND METHOD OF CONTROLLING ATTITUDE OF VEHICLE BODY OF AMPHIBIOUS VEHICLE

(71) Applicant: MITSUBISHI HEAVY INDUSTRIES, LTD., Tokyo (JP)

(72) Inventors: Takaaki Oshima, Tokyo (JP); Shinichi Sato, Tokyo (JP); Satoru Ishikawa, Tokyo (JP); Takashi Matsunaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/552,848

(22) PCT Filed: Nov. 17, 2015

(86) PCT No.: PCT/JP2015/082291
§ 371 (c)(1),
(2) Date: Aug. 23, 2017

(87) PCT Pub. No.: WO2016/136047
PCT Pub. Date: Sep. 1, 2016

(65) Prior Publication Data
US 2018/0056742 A1    Mar. 1, 2018

(30) Foreign Application Priority Data
Feb. 27, 2015 (JP) ................. 2015-039567

(51) Int. Cl.
*B60F 3/00* (2006.01)
*B63B 1/40* (2006.01)

(52) U.S. Cl.
CPC ............. *B60F 3/0038* (2013.01); *B60F 3/00* (2013.01); *B63B 1/40* (2013.01); *Y02T 70/12* (2013.01)

(58) Field of Classification Search
CPC ................................ B60F 3/0038
See application file for complete search history.

(56) References Cited

U.S. PATENT DOCUMENTS

| 5,765,497 A | 6/1998 | Thomas et al. |
| 2005/0239351 A1* | 10/2005 | Darby ........... B60F 3/0038 440/12.51 |
| 2008/0210148 A1* | 9/2008 | Mizutani ......... B63H 20/12 114/144 RE |

FOREIGN PATENT DOCUMENTS

| JP | 5-69884 A | 3/1993 |
| JP | 9-76992 A | 3/1997 |

(Continued)

OTHER PUBLICATIONS

International Search Report and Written Opinion of the International Searching Authority (Forms PCT/ISA/210 and PCT/ISA/237) for International Application No. PCT/JP2015/082291, dated Feb. 9, 2016.

*Primary Examiner* — Stephen P Avila
(74) *Attorney, Agent, or Firm* — Birch Stewart Kolasch & Birch, LLP

(57) ABSTRACT

The objective of the present invention is to provide an amphibious vehicle and a method of controlling the attitude of the vehicle body of an amphibious vehicle, with which it is possible to reduce the fluid resistance when traveling on water and to improve the propulsion performance of the vehicle main body. An amphibious vehicle 1 according to the present invention is characterized in being provided with: a vehicle main body 11 capable of moving on water and on land; a rear flap 14B provided at the rear of the vehicle main body 11; a drive unit 33 which drives the rear flap 14B to vary a flap angle θ1 between the vehicle main body 11 and the rear flap 14B; a detecting unit 31 which detects a trim angle of the vehicle main body 11, a vehicle (Continued)

speed and the flap angle θ1; and a control unit 32 which controls the flap angle θ1 on the basis of the trim angle, the vehicle speed and the flap angle θ1 detected by the detecting unit 31.

6 Claims, 7 Drawing Sheets

(56) References Cited

FOREIGN PATENT DOCUMENTS

| | | | |
|---|---|---|---|
| JP | 2002-68072 | A | 3/2002 |
| JP | 2006-525918 | A | 11/2006 |
| JP | 4530505 | B2 | 8/2010 |
| JP | 2011-251596 | A | 12/2011 |

* cited by examiner

AMPHIBIOUS VEHICLE AND METHOD OF CONTROLLING ATTITUDE OF VEHICLE BODY OF AMPHIBIOUS VEHICLE

TECHNICAL FIELD

The present invention relates to an amphibious vehicle and a method of controlling an attitude of a vehicle body of an amphibious vehicle, and for example, to an amphibious vehicle in which a plate-shape member is provided at the rear of a vehicle main body and a method of controlling an attitude of a vehicle body of an amphibious vehicle.

BACKGROUND ART

In the related art, a stern flap device is suggested in which a flap is provided on a submerged lower end of a transom of a ship having a transom stern structure (for example, refer to PTL 1). In the stern flap device, by controlling a flap angle corresponding to a navigation speed of the ship using a swing mechanism, it is possible to reduce fuel consumption associated with the navigation of the ship.

CITATION LIST

Patent Literature

[PTL 1] Japanese Patent No. 4530505

SUMMARY OF INVENTION

Technical Problem

Meanwhile, in an amphibious vehicle, in order to improve runnability with respect to an irregular ground on land, a shape of a bottom surface of the vehicle is smoothened and the entire length of a vehicle main body is shortened. In the amphibious vehicle, the vehicle main body tilts forward at a low speed such as traveling on water, the vehicle main body tilts rearward due to bow waves of the vehicle main body at a middle speed, and at a high speed, a dynamic lift acts on a bottom surface of the vehicle main body, and the inclination of the vehicle main body decreases. In this way, in the amphibious vehicle of the related art, since a change of a trim angle of the vehicle main body is increased according to the change of the speed at the time of traveling on water, a technology is required, which can reduce influences of a fluid resistance of water with respect to the vehicle main body at the time of traveling on water by appropriately controlling the trim angle.

The present invention is made in consideration of the above-described circumstances, and an object thereof is to provide an amphibious vehicle and a method of controlling an attitude of a vehicle body of an amphibious vehicle capable of reducing a fluid resistance at the time of traveling on water and improving propulsion performance of a vehicle main body.

Solution to Problem

According to an aspect of the present invention, there is provided an amphibious vehicle, including: a vehicle main body which can move on water and on land; a rear flap which is provided at the rear of the vehicle main body; a drive unit which drives the rear flap to change a flap angle between the vehicle main body and the rear flap; a detecting unit which detects a trim angle of the vehicle main body, a vehicle speed, and the flap angle; and a control unit which controls the flap angle based on the trim angle, the vehicle speed, and the flap angle detected by the detecting unit.

According to the amphibious vehicle, since the flap angle can be appropriately controlled by detecting the trim angle, the vehicle speed, and the flap angle at the time of traveling on water, it is possible to appropriately control the attitude of the vehicle body at the time of traveling on water. Accordingly, in the amphibious vehicle, since it is possible to reduce a fluid resistance at the time of traveling on water, it is possible to improve propulsion performance of the vehicle main body such as improvement of a speed at the time of traveling on water.

In the amphibious vehicle of the present invention, preferably, the control unit controls the flap angle based on a relationship between the vehicle speed and an optimum angle of the flap angle acquired in advance. According to this configuration, in the amphibious vehicle, since the flap angle can be controlled toward the optimum angle according to the vehicle speed, it is possible to more appropriately control the attitude of the vehicle body at the time of traveling on water.

In the amphibious vehicle of the present invention, preferably, the control unit detects a trim angle (hereinafter, referred to as an initial trim angle) in a stationary state of the vehicle main body and controls the flap angle based on a relationship between the vehicle speed corresponding to the detected initial trim angle and an optimum angle of the flap angle acquired in advance. According to this configuration, in the amphibious vehicle, since the flap angle can be controlled toward an optimum flap angle corresponding to the initial trim angle according to vehicle characteristics of the vehicle main body, it is possible to more appropriately control the attitude of the vehicle body at the time of traveling on water.

In the amphibious vehicle of the present invention, preferably, the control unit controls the flap angle based on a relationship between the vehicle speed and an optimum angle of the trim angle acquired in advance. According to this configuration, in the amphibious vehicle, since the flap angle can be controlled toward the optimum angle of the trim angle according to the vehicle speed, it is possible to more appropriately control the attitude of the vehicle body at the time of traveling on water.

In the amphibious vehicle of the present invention, preferably, the control unit has a function which calculates a displacement amount of a flap angle for controlling an increase and a decrease of the flap angle based on an average relationship between a displacement amount of the trim angle and a displacement amount of the flap angle acquired in advance. According to this configuration, in the amphibious vehicle, since the flap angle can be more easily controlled toward the optimum angle of the trim angle according to the vehicle speed, it is possible to more appropriately control the attitude of the vehicle body at the time of traveling on water.

According to another aspect of the present invention, there is provided a method of controlling an attitude of a vehicle body of an amphibious vehicle, including: a first step of detecting a vehicle speed of a vehicle main body; and a second step of controlling a flap angle based on the detected vehicle speed and a relationship between the vehicle speed and an optimum angle of the flap angle of a rear flap provided at the rear of the vehicle main body acquired in advance.

According to the method of controlling an attitude of a vehicle body of an amphibious vehicle, since the flap angle can be controlled toward the optimum angle according to the vehicle speed, it is possible to appropriately control the attitude of the vehicle body at the time of traveling on water. Accordingly, in the method of controlling an attitude of a vehicle body of an amphibious vehicle, since it is possible to reduce a fluid resistance at the time of traveling on water, it is possible to improve propulsion performance of the vehicle main body such as improvement of a speed at the time of traveling on water.

According to still another aspect of the present invention, there is provided a method of controlling an attitude of a vehicle body of an amphibious vehicle, including: a first step of detecting a vehicle speed of a vehicle main body and a trim angle; and a second step of controlling a flap angle of a rear flap provided at the rear of the vehicle main body based on the detected vehicle speed and a relationship between the vehicle speed and an optimum angle of the trim angle acquired in advance.

According to the method of controlling an attitude of a vehicle body of an amphibious vehicle, since the flap angle can be controlled toward the optimum angle of the trim angle according to the vehicle speed, it is possible to appropriately control the attitude of the vehicle body at the time of traveling on water. Therefore, in the method of controlling an attitude of a vehicle body of an amphibious vehicle, since it is possible to reduce a fluid resistance at the time of traveling on water, it is possible to improve propulsion performance of the vehicle main body such as improvement of a speed at the time of traveling on water.

Advantageous Effects of Invention

According to the present invention, it is possible to realize the amphibious vehicle and the method of controlling an attitude of a vehicle body of an amphibious vehicle capable of reducing the fluid resistance at the time of traveling on water and improving propulsion performance of the vehicle main body.

DESCRIPTION OF EMBODIMENTS

Figure 1:
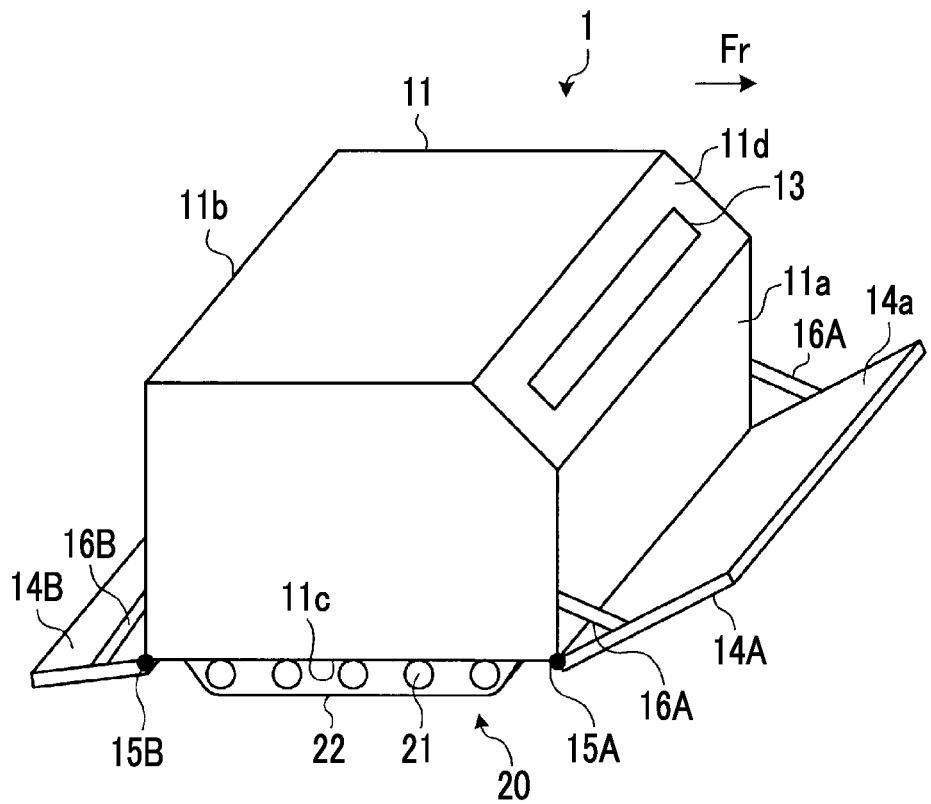
FIG. 1 is a schematic perspective view of an amphibious vehicle according to an embodiment of the present invention.

Hereinafter, an embodiment of the present invention will be described in detail with reference to the accompanying drawings. Moreover, the present invention is not limited to the following embodiments and can be embodied to be appropriately modified. In addition, the following embodiments can be embodied to be appropriately combined. Moreover, the same reference numerals are assigned to the components common to the embodiments and overlapping descriptions are omitted.

Figure 2:
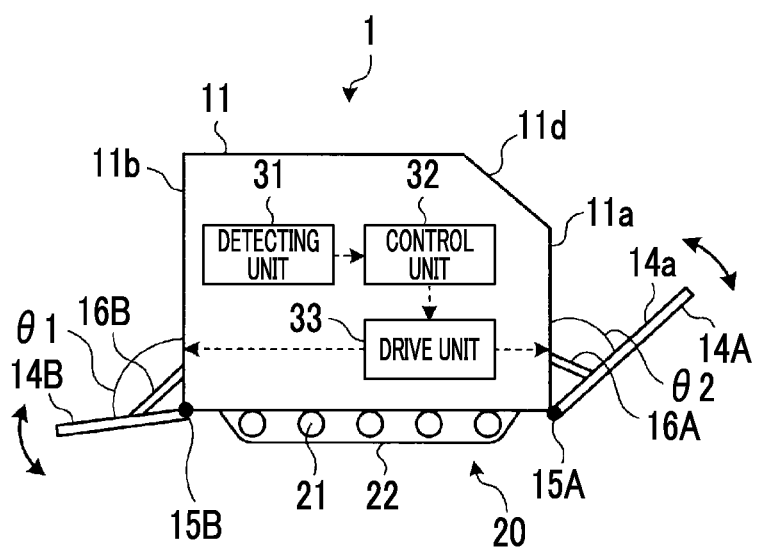
FIG. 2 is a side view of the amphibious vehicle according to the embodiment of the present invention.

FIG. 1 is a schematic perspective view of an amphibious vehicle 1 according to an embodiment of the present invention. FIG. 2 is a side view of the amphibious vehicle 1 according to the embodiment of the present invention. As shown in FIGS. 1 and 2, the amphibious vehicle 1 according to the present embodiment includes a vehicle main body 11 having a smooth bottom surface 11c which is formed in an approximately rectangular parallelepiped shape and a traveling device 20 provided below the vehicle main body 11. The vehicle main body 11 is provided with a water propulsion unit (not shown) having a propeller or a water jet used in an on-water traveling mode. The traveling device 20 includes a sprocket 21 which is rotationally driven by a drive device (not shown) such as an engine and a crawler belt 22 which is rotationally driven by the sprocket 21. A vehicle window 13 is provided on a front surface 11a in a traveling direction Fr of the amphibious vehicle 1. In addition, in FIG. 1, an example in which the vehicle main body 11 is driven by the traveling device 20 having the crawler belt 22 is described. However, a traveling device having tires instead of the crawler belt 22 may be used.

A one end portion of a front flap 14A is fixed to a lower end portion of the front surface 11a of the vehicle main body 11. The front flap 14A is attached to the lower end portion of the front surface 11a of the vehicle main body 11 via a hinge 15A such that a main surface 14a is inclined to the front surface 11a of the vehicle main body 11. The front flap 14A is attached to the lower end portion of the vehicle main body 11 via an extensible and contractible support member 16A having a fixed one end such that the main surface 14a has a predetermined flap angle θ2 between the main surface 14a and the front surface 11a of the vehicle main body 11. The support member 16A is provided to be extensible and contractible in front and rear directions in an advancement direction of the vehicle main body 11.

In addition, a one end portion of a rear flap 14B is fixed to a lower end portion of a rear surface 11b of the vehicle main body 11. The rear flap 14B is attached to the lower end portion of the rear surface 11b of the vehicle main body 11 via a hinge 15B such that a main surface 14b is inclined to the rear surface 11b of the vehicle main body 11. The rear flap 14B is attached to the lower end portion of the vehicle main body 11 via an extensible and contractible support member 16B having a fixed one end such that the main surface 14b has a predetermined flap angle θ1 (refer to FIG. 2) between the main surface 14b and the rear surface 11b of the vehicle main body 11.

In addition, in the above-described embodiment, an example is described in which the front flap 14A is rotatably attached to the lower end portion of the front surface 11a of the vehicle main body 11 and the rear flap 14B is rotatably attached to the lower end portion of the rear surface 11b of the vehicle main body 11. However, the front flap 14A and the rear flap 14B are not limited to this configuration. The front flap 14A may be provided on the front surface 11a side of the vehicle main body 11 and is not necessarily fixed to the lower end portion of the front surface 11a of the vehicle main body 11. Similarly, the rear flap 14B may be provided on the rear surface 11b side of the vehicle main body 11 and is not necessarily fixed to the lower end portion of the rear surface 11b of the vehicle main body 11. Moreover, the rear flap 14B may be installed in the vicinity of the rear end of the bottom surface 11c of the vehicle main body 11.

In addition, the amphibious vehicle 1 includes a detecting unit 31 which detects the flap angle θ1 between the rear flap 14B and the rear surface 11b of the vehicle main body 11, a control unit 32 which controls the flap angle θ1 between the rear flap 14B and the rear surface 11b of the vehicle main body 11 based on the flap angle θ1 detected by the detecting unit 31, and a drive unit 33 which drives and rotates the front flap 14A and the rear flap 14B such that the flap angle becomes the flap angle θ1 calculated by the control unit 32. The detecting unit 31 is not particularly limited as long as effects of the present invention are obtained, and for example, a detecting unit may be used, which includes various angle sensors for detecting a trim angle θ3 in a pitching direction acting on the vehicle main body 11, a ship speed indicator configured of a Doppler speed log a GPS, or the like for detecting a vehicle speed, a gyroscope for detecting the trim angle θ3 of the vehicle main body 11, or the like, an inclinometer, or the like. In addition, here, the trim angle θ3 indicates an inclination of the vehicle main body 11 with respect to a horizontal direction. The drive unit 33 is not particularly limited as long as effects of the present invention are obtained, and for example, may use various actuators, or the like.

Moreover, in the amphibious vehicle 1, the rear flap 14B on the rear surface 11b side of the vehicle main body is fixed via the hinge 15B so as to be rotatably relative to the rear surface 11b of the vehicle main body 11. The rear flap 14B is configured to be fixable to the rear surface 11b of the vehicle main body 11 by a fixing member (not shown). In addition, the rear flap 14B may be fixed such that the hinge 15B is driven by the drive unit 33 and the main surface 14b is rotatable with respect to the rear surface 11b of the vehicle main body 11, or the rear flap 14B may be fixed such that the support member 16B is driven by the drive unit 33 and the main surface 14b is rotatable with respect to the rear surface 11b of the vehicle main body 11.

In the amphibious vehicle 1, the detecting unit 31 detects the flap angle θ1 at any time at the time of traveling on water and inputs the detected flap angle θ1 to the control unit 32. The control unit 32 determines whether or not the flap angle θ1 detected by the detecting unit 31 is within a predetermined range which is preset according to a sailing speed. In addition, in a case where the flap angle θ1 is out of the preset range, the control unit 32 calculates a deviation required for causing the flap angle θ1 to fall within the preset range and inputs the calculated deviation to the drive unit 33. The drive unit 33 drives the support member 16B to rotate the rear flap 14B with the hinge 15B as a fulcrum such that the flap angle θ1 falls within the preset range. By controlling in this manner, in the amphibious vehicle 1, the attitude of the vehicle body can be maintained in an appropriate state corresponding to the speed. In addition, in the above-described embodiment, an example in which the drive unit 33 drives the support member 16B to rotate the rear flap 14B is described. However, the specific driving method is not limited as long as the drive unit 33 can rotate the hinge 15B so as to rotate the rear flap 14B.

Figure 3A:
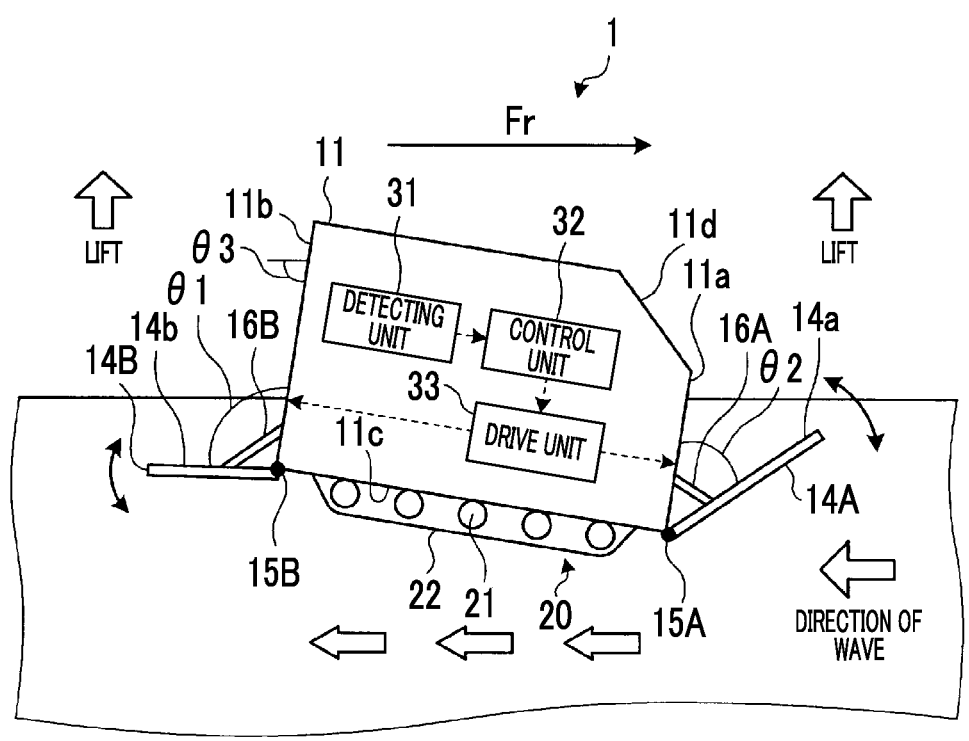
FIG. 3A is an explanatory view of an attitude of a vehicle body when the amphibious vehicle according to the embodiment of the present invention travels on water at a low speed.
Figure 3B:
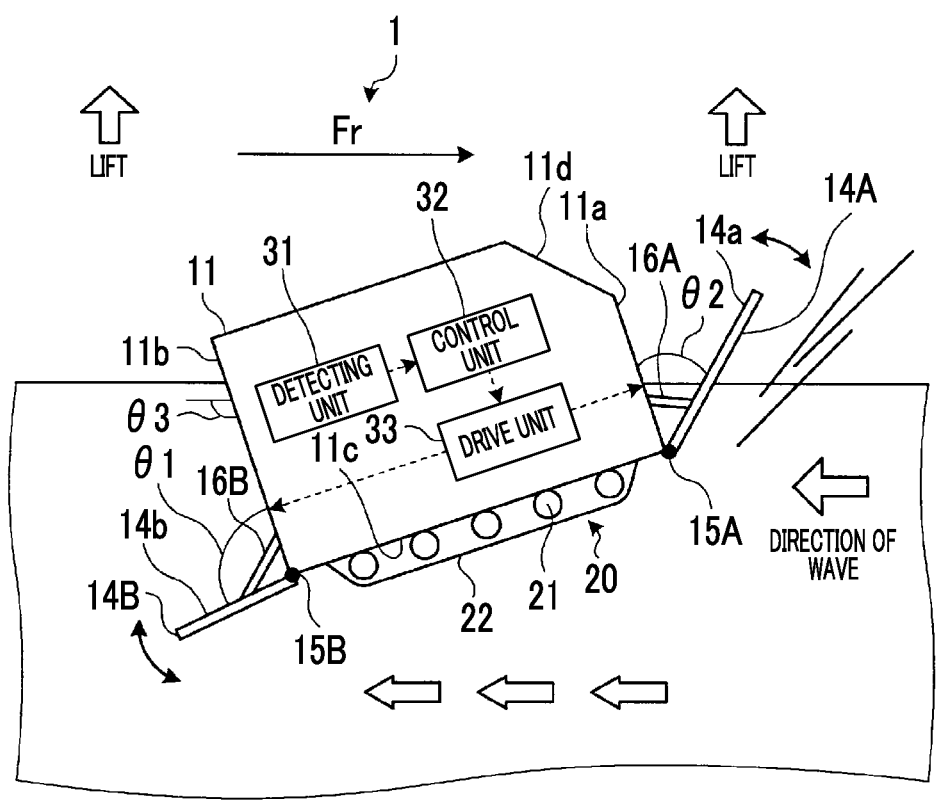
FIG. 3B is an explanatory view of the attitude of the vehicle body when the amphibious vehicle according to the embodiment of the present invention travels on water at a middle speed.
Figure 3C:
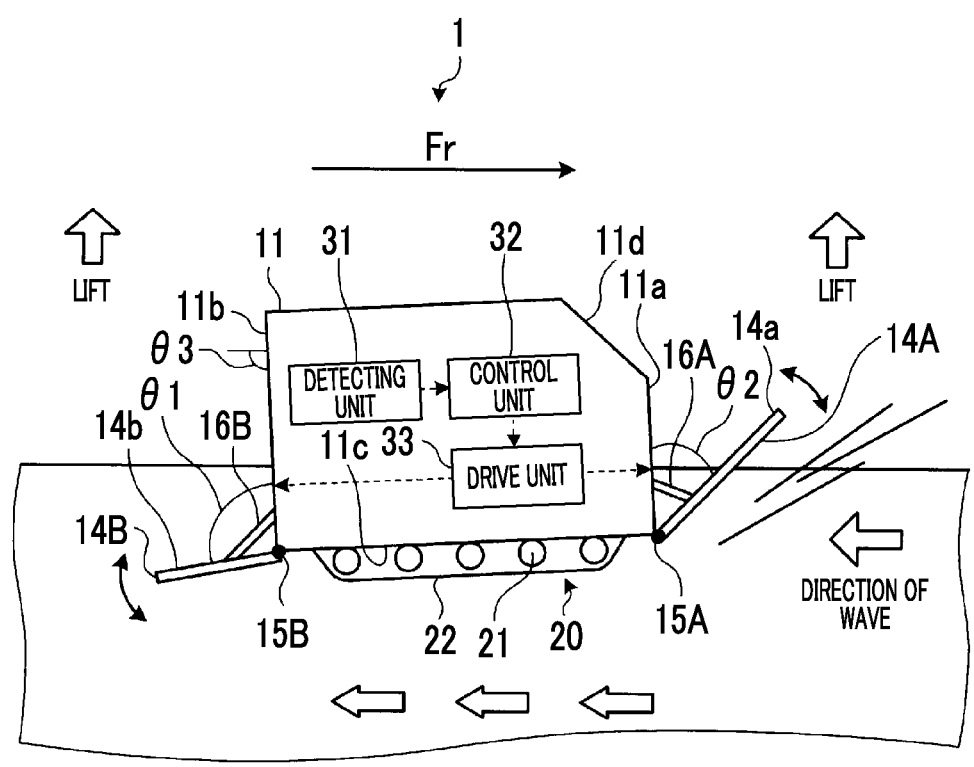
FIG. 3C is an explanatory view of the attitude of the vehicle body when the amphibious vehicle according to the embodiment of the present invention travels on water at a high speed.

Next, the attitude of the vehicle body of the amphibious vehicle 1 at the time of traveling on water will be described with reference to FIGS. 3A to 3C. FIG. 3A is an explanatory view of the attitude of the vehicle body when the amphibious vehicle 1 travels on water at a low speed, FIG. 3B is an explanatory view of the attitude of the vehicle body when the amphibious vehicle 1 travels on water at a middle speed, and FIG. 3C is an explanatory view of the attitude of the vehicle body when the amphibious vehicle 1 travels on water at a high speed.

As shown in FIG. 3A, in the amphibious vehicle 1, in order to improve runnability with respect to an irregular ground on land, the shape of the bottom surface 11c of the vehicle main body 11 is smoothened and the entire length of the vehicle main body 11 is shortened. As shown in FIG. 3A, in the navigation attitude of the amphibious vehicle 1 at the time of traveling on water, in a low speed (for example, 10 km/h or less), the trim angle θ3 tilts forward in a direction in which the front of the vehicle main body subsides while the vehicle main body 11 sinks. In addition, as shown in FIG. 3B, if the speed of the amphibious vehicle 1 becomes a middle speed (for example, 15 km/h to 25 km/h), a great water pressure acts on the front side of the vehicle main body 11 by bow waves on the front side of the vehicle main body 11, the front side of the vehicle main body 11 rises and the rear side thereof sinks, and the trim angle θ3 of the vehicle main body 11 largely increases in a direction in which the front side of the vehicle main body 11 is lifted. Moreover, as shown in FIG. 3C, if the amphibious vehicle 1 becomes a high speed (for example, 25 km/h or more), dynamic lifts act on the bottom surface 11c of the vehicle main body 11, the vehicle main body 11 floats so as to slide, and the trim angle θ3 of the vehicle main body 11 decreases. In this way, in the amphibious vehicle 1 in which the bottom surface 11c of the vehicle main body 11 is smooth and the entire length is short, the change of the trim angle θ3 according to the change of the sailing speed of the vehicle main body 11 at the time of traveling on water increases.

Accordingly, the present inventors focused on a relationship between the vehicle speed of the amphibious vehicle 1 and the flap angle of the rear flap 14B and a relationship between the vehicle speed and the trim angle θ3. In addition, the present inventors found that by controlling the angle of the rear flap 14B according to the vehicle speed of the amphibious vehicle 1 at the time of traveling on water, it was possible to set the trim angle θ3 of the amphibious vehicle 1 to an appropriate range and control the attitude of the vehicle body of the amphibious vehicle 1. Hereinafter, a method of controlling an attitude of a vehicle body of the amphibious vehicle 1 according to the present embodiment will be described in detail.

A method of controlling an attitude of a vehicle body of the amphibious vehicle 1 according to a first embodiment of the present invention includes a first step of detecting the vehicle speed of the vehicle main body 11, and a second step of controlling the flap angle θ2 based on the detected vehicle speed and a relationship between a vehicle speed and an optimum angle of the flap angle θ1 of the rear flap 14B provided at the rear of the vehicle main body 11 acquired in advance.

Figure 4:
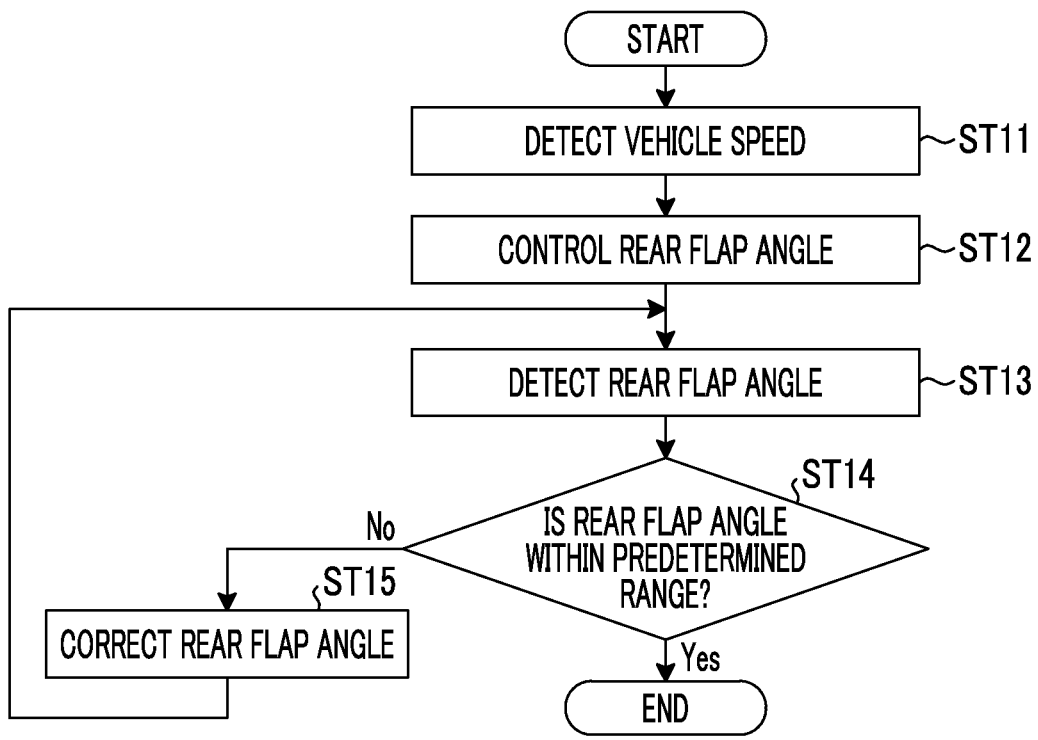
FIG. 4 is a flowchart showing an example of a method of controlling an attitude of a vehicle body of an amphibious vehicle according to a first embodiment of the present invention.

FIG. 4 is a flowchart showing an example of the method of controlling an attitude of a vehicle body of the amphibious vehicle 1 according to the first embodiment of the present invention. As shown in FIG. 4, in the method of controlling an attitude of a vehicle body of the amphibious vehicle 1 according to the present embodiment, the control unit 32 detects the vehicle speed of the amphibious vehicle 1 via the detecting unit 31 (Step ST11), and controls the flap angle θ1 of the rear flap 14B via the drive unit 33 based on the detected vehicle speed (Step ST12). Here, the control unit 32 outputs an output signal based on a map of the relationship between the vehicle speed of the amphibious vehicle 1 and the optimum angle of the flap angle θ1 acquired in advance to the drive unit 33 to control the flap angle θ1. Next, the control unit 32 detects the flap angle θ1 of the rear flap 14B via the detecting unit 31 (Step ST13) and determines whether or not the detected flap angle θ1 is within a predetermined range of a target value of the above-described map (Step ST14). As a result, in a case where the detected flap angle θ1 of the rear flap 14B is not within the predetermined range (Step ST14: No), the control unit 32 obtains a deviation between the flap angle θ1 and the above-described target value of the flap angle θ1 and corrects the flap angle θ1 of the rear flap 14B via the drive unit 33 such that the flap angle θ1 is within the predetermined range of the above-described map (Step ST15). In addition, in a case where the detected flap angle θ1 of the rear flap 14B is within the predetermined range (Step ST14: Yes), the control unit 32 ends the control of the flap angle θ1. In this way, in the present embodiment, by controlling the flap angle θ1 based on the relationship between the vehicle speed of the amphibious vehicle 1 and the optimum angle of the flap angle θ1 of rear flap 14B acquired in advance, even in a case where the vehicle speed of the amphibious vehicle 1 is changed, it is possible to set the trim angle θ3 within the predetermined range according to the vehicle speed. Therefore, it is possible to maintain the attitude of the vehicle body of the amphibious vehicle 1 in an appropriate traveling trim state according to the speed.

Moreover, the example shown in FIG. 4 may be performed as follow. The control unit 32 detects an initial trim angle which is the trim angle θ3 in a stationary state when the amphibious vehicle 1 starts the traveling on water, via the detecting unit 31. Next, in a map (refer to FIG. 5) of a relationship between the vehicle speed of the amphibious vehicle 1 and the optimum angle of the flap angle θ1, the control unit 32 prepares a plurality of curves corresponding to initial trim angles different from each other in advance and may obtain the trim angle by interpolating the optimum vehicle speed corresponding to the initial trim from the plurality of curves and the curve of the flap angle θ1 using the detected initial trim angle. In the amphibious vehicle 1, the map between the vehicle speed and the optimum angle of the flap angle θ1 of the rear flap 14B is changed according to the initial trim angle due to the vehicle characteristics according to the shape of the vehicle main body 11 or the change of the center of gravity due to a load or the like. In the example shown in FIG. 5, with respect to a case where the initial trim angle is not present (refer to a solid line L1 in FIG. 5), in a case where the initial trim angle is larger (refer to a dotted line L2 in FIG. 5), the flap angle θ1 of the rear flap 14B is likely to increase, and in a case where the initial trim angle is smaller (refer to a one-dot chain line L3 in FIG. 5), the flap angle θ1 of the rear flap 14B is likely to decrease. By controlling in this manner, it is possible to maintain the attitude of the vehicle body of the amphibious vehicle 1 in a more appropriate traveling trim state according to the speed.

A method of controlling an attitude of a vehicle body of the amphibious vehicle 1 according to a second embodiment of the present invention includes a first step of detecting the vehicle speed of the vehicle main body 11 and the trim angle θ3, and a second step of controlling the flap angle θ1 of the rear flap 14B provided at the rear of the vehicle main body 11 based on the detected vehicle speed and a relationship between the vehicle speed and the optimum angle of the trim angle θ3 acquired in advance.

Figure 6:
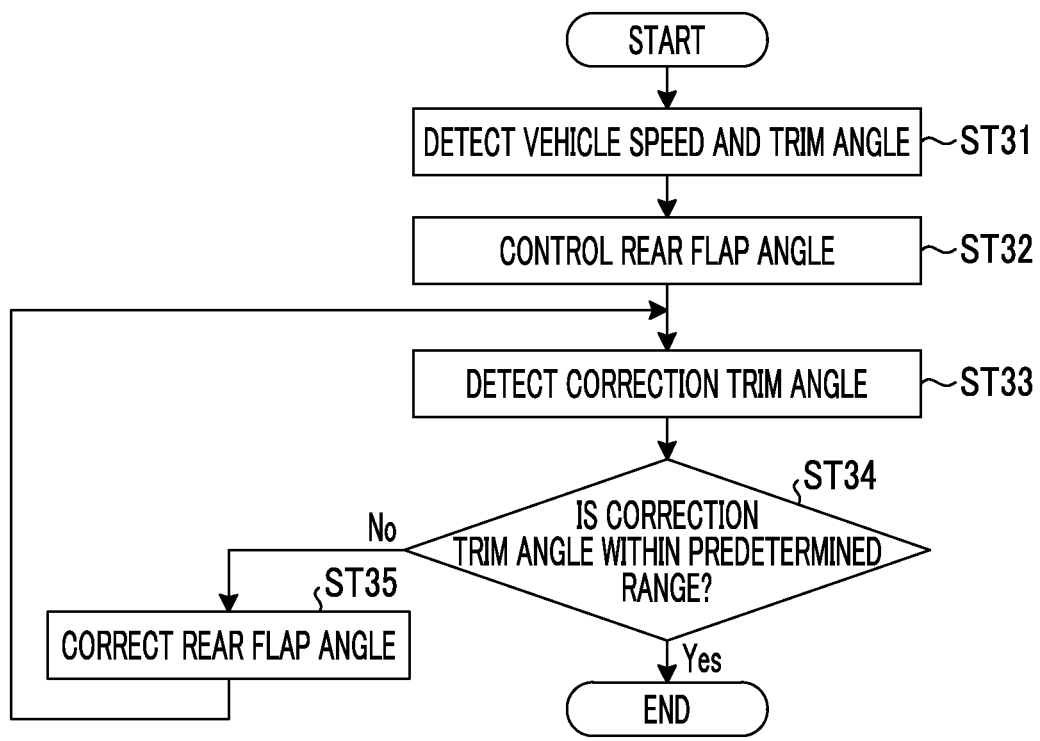
FIG. 6 is a flowchart showing an example of a method of controlling an attitude of a vehicle body of an amphibious vehicle according to a second embodiment of the present invention.

FIG. 6 is a flowchart showing an example of the method of controlling an attitude of a vehicle body of the amphibious vehicle 1 according to the second embodiment of the present invention. As shown in FIG. 6, in the method of controlling an attitude of a vehicle body of the amphibious vehicle 1 according to the present embodiment, the control unit 32 detects the vehicle speed and the trim angle θ3 of the amphibious vehicle 1 via the detecting unit 31 (Step ST31), and controls the flap angle θ1 of the rear flap 14B via the drive unit 33 based on the detected vehicle speed and the trim angle θ3 (Step ST32). Here, after the control unit 32 performs signal processing such as A/D conversion on an output signal based on a map of the relationship between the vehicle speed of the amphibious vehicle 1 and the optimum angle of the flap angle θ1 acquired in advance, the control unit 32 outputs the processed signal to the drive unit 33 to control the flap angle θ1. In addition, here, in a case where the detected trim angle θ3 of the vehicle main body 11 is within a predetermined range of the optimum angle (Step ST34: Yes), the control unit does not change the angle of the flap angle θ1 and ends the control of the flap angle θ1.

Figure 7:
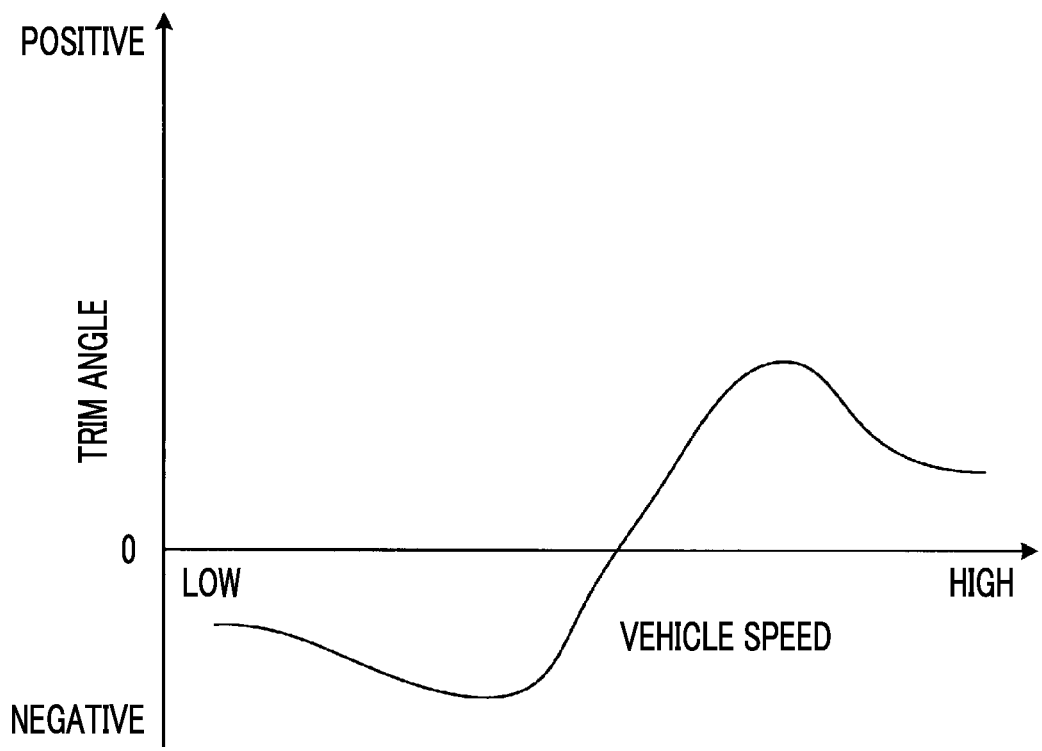
FIG. 7 is a view showing an example of a relationship between a vehicle speed and an optimum angle of a trim angle of the amphibious vehicle acquired in advance according to the second embodiment of the present invention.
Figure 8:
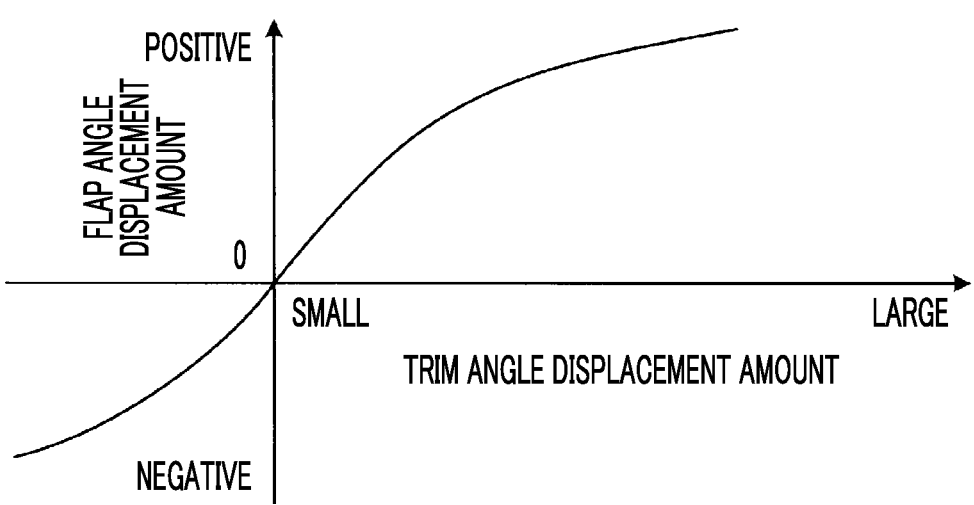
FIG. 8 is a view showing an example of a relationship between a trim angle and a flap angle of the amphibious vehicle according to the second embodiment of the present invention.

In the present embodiment, the control unit 32 controls the flap angle θ1 of the rear flap 14B via the drive unit 33 based on the relationship between the vehicle speed and the optimum angle of the trim angle θ3 and the relationship acquired in advance between the trim angle θ3 and the flap angle θ1 acquired in advance. FIG. 7 is a view showing an example of a relationship between the vehicle speed and the optimum angle of the trim angle θ3 acquired in advance at the time of traveling at the same speed as the vehicle speed, and FIG. 8 is a view of showing an example of a displacement amount Δθ1 of the flap angle required for changing the trim angle θ3 by Δθ3. As shown in FIG. 7, in the present embodiment, by obtaining the relationship between the vehicle speed of the amphibious vehicle 1 and the optimum angle of the trim angle θ3 in advance to control the flap angle θ1 of the rear flap 14B, it is possible to set the trim angle θ3 of the vehicle main body 1 within a predetermined range with respect to the optimum angle. As shown in FIG. 8, when an angle change command for controlling an increase and a decrease in the flap angle is issued, since the control unit 32 has a function which calculates the angle change command for controlling the increase and the decrease of the flap angle using an average relationship between the displacement amount Δθ3 of the trim angle and the displacement amount Δθ1 of the flap angle of the rear flap 14B acquired in advance, it is possible to easily adjust the flap angle θ1 of the rear flap 14B within the range in which the optimum angle of the trim angle θ3 can be obtained. For example, here, the average relationship is a value of the displacement amount Δθ1 of the flap angle of the rear flap 14B with respect to the displacement amount Δθ3 of the plurality of trim angles θ3 acquired in advance, but the present invention is not limited this.

Next, the control unit 32 controls the flap angle θ1 of the rear flap 14B via the detecting unit 31 and thereafter, detects a correction trim angle θ3 of the vehicle main body 11 (Step ST33). In addition, the control unit 32 determines whether or not the detected correction trim angle θ3 is within the predetermined range of the target value of the above-described map (Step ST 34). As a result, in a case where the detected trim angle of the vehicle main body 11 is not within the predetermined range (Step ST34: No), the control unit 32 obtains a deviation between the trim angle θ3 and the target value of the trim angle θ3 and drives the flap angle θ1 of the rear flap 14B via the drive unit 33 to correct the trim angle θ3 such that the trim angle θ3 of the vehicle main body 11 is within the predetermined range of the above-described map (Step ST35). Moreover, in a case where the detected trim angle θ3 of the vehicle main body 11 is within the predetermined range (Step ST34: Yes), the control unit 32 ends the control of the flap angle θ1. In this way, in the present embodiment, by controlling the flap angle θ1 based on the relationship between the vehicle speed of the amphibious vehicle 1 and the optimum angle of the trim angle θ3 of the vehicle main body 11 acquired in advance, even in a case where the vehicle speed of the amphibious vehicle 1 is changed, it is possible to set the trim angle θ3 within the predetermined range according to the vehicle speed. Therefore, it is possible to maintain the attitude of the vehicle body of the amphibious vehicle 1 in an appropriate state according to the speed.

As described above, according to the amphibious vehicle 1 of the embodiments, since the flap angle can be appropriately controlled by detecting the trim angle θ3, the vehicle speed, and the flap angle θ1 at the time of traveling on water, it is possible to appropriately control the attitude of the vehicle body at the time of traveling on water. Accordingly, in the amphibious vehicle 1, since it is possible to reduce a fluid resistance at the time of traveling on water, it is possible to improve propulsion performance of the vehicle main body 11 such as improvement of a speed at the time of traveling on water.

Figure 5:
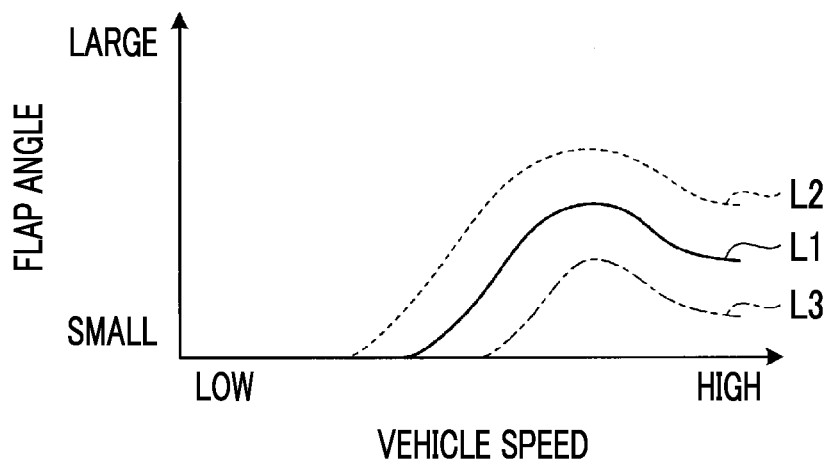
FIG. 5 is an explanatory view of a relationship between a vehicle speed of an amphibious vehicle and an initial trim angle according to the first embodiment of the present invention.

Moreover, in the above-described embodiments, the example is described in which each of the front flap 14A and the rear flap 14B uses a flat plate-shaped member. However, the shape of each of the front flap 14A and the rear flap 14B may be appropriately changed to a plate-shaped member other than a flat plate such as a corrugated plate as long as effects of the present invention are obtained. In addition, the width of each of the front flap 14A and the rear flap 14B may be appropriately changed as long as effects of the present invention are obtained. Moreover, in the embodiments, the example is described in which the front flap 14A and the rear flap 14B are attached to the vehicle main body 11 by the hinges 15A and 15B. However, the front flap 14A and the rear flap 14B are not necessarily fixed using the hinges 15A and 15B as long as the main surfaces 14a and 14b maintain the predetermined flap angles θ1 and θ2 between the front surface 11a and the rear surface 11b of the vehicle main body 11. Moreover, in the embodiments, the example is described in which the front flap 14A and the rear flap 14B are fixed to the vehicle main body 11 by the support members 16A and 16B. However, the front flap 14A and the rear flap 14B are not necessarily fixed to the vehicle main body 11 via the support members 16A and 16B. In addition, in the above-described embodiments, the example is described in which the front flap 14A is configured of one plate member. However, the front flap 14A may be configured of a plurality of plate members such as a lower flap and an upper flap. In this case, preferably, the map for controlling the flap angle shown in FIGS. 5, 7, and 8 is prepared for each a drainage amount of an amphibious vehicle or is calculated by interpolating a map with respect to a predetermined drainage amount using a prepared group of maps for each drainage amount.

In addition, in the amphibious vehicle 1, the flap angle θ2 between the front flap 14A and the front surface 11a of the vehicle main body 11 may be detected by the detecting unit 31, the flap angle θ2 between the front flap 14A and the front surface 11a of the vehicle main body 11 may be controlled by the control unit 32 based on the detected flap angle θ2, and the rear flap 14B may be driven by the drive unit 33 to be rotated such that the flap angle becomes the flap angle θ2 calculated by the control unit 32.

REFERENCE SIGNS LIST

1: amphibious vehicle
11: vehicle main body
11a: front surface
11b: rear surface
11c: bottom surface
11d: inclined surface
13: vehicle window
14A: front flap
14B: rear flap
15A, 15B: hinge
16A, 16B: support member
20: traveling device
21: sprocket
22: crawler belt
31: detecting unit
32: control unit
33: drive unit

The invention claimed is:

1. An amphibious vehicle, comprising:
a vehicle main body which can move on water and on land;
a rear flap which is provided at a rear of the vehicle main body;
a drive unit which drives the rear flap to change a flap angle between the vehicle main body and the rear flap;
a detecting unit which detects a trim angle of the vehicle main body, a vehicle speed, and the flap angle; and
a control unit which controls the flap angle based on the trim angle, the vehicle speed, and the flap angle detected by the detecting unit, wherein the control unit
causes the detecting unit to detect a correction trim angle after controlling the flap angle based on a relationship between the vehicle speed and an optimum angle of the flap angle acquired in advance,
determines whether the detected correction trim angle is within a predetermined range of a target value based on a relationship between the vehicle speed and an optimum angle of the trim angle acquired in advance,
calculates, when the correction trim angle is not within the predetermined range, a displacement amount of a flap angle for controlling an increase and a decrease of the flap angle based on an average relationship between a displacement amount of the trim angle and a displacement amount of the flap angle acquired in advance, and
controls the flap angle based on the calculated displace amount of the flap angle.

2. The amphibious vehicle according to claim 1, wherein the control unit detects an initial trim angle of the vehicle main body and controls the flap angle based on the detected initial trim angle.

3. A method of controlling an attitude of a vehicle body of an amphibious vehicle, comprising:
- a first step of detecting a vehicle speed of a vehicle main body; and
- a second step of controlling a flap angle based on the detected vehicle speed and a relationship between the vehicle speed and an optimum angle of a flap angle of a rear flap provided at the rear of the vehicle main body acquired in advance,
- a third step of detecting a correction trim angle and determining whether the detected correction trim angle is within a predetermined range of a target value based on a relationship between the vehicle speed and an optimum angle of the trim angle acquired in advance,
- a fourth step of calculating, when the correction trim angle is not within the predetermined range, a displacement amount of a flap angle for controlling an increase and a decrease of the flap angle based on an average relationship between a displacement amount of the trim angle and a displacement amount of the flap angle acquired in advance and controlling the flap angle based on the calculated displace amount of the flap angle.

4. An amphibious vehicle, comprising:
- a vehicle main body which can move on water and on land;
- a rear flap which is provided at a rear of the vehicle main body;
- a drive unit which drives the rear flap to change a flap angle between the vehicle main body and the rear flap;
- a detecting unit which detects a trim angle of the vehicle main body, a vehicle speed, and the flap angle; and
- a control unit which controls the flap angle based on the trim angle, the vehicle speed, and the flap angle detected by the detecting unit, wherein
- the controller has a map based on a relationship between the vehicle speed of the vehicle main body and an optimum angle of the flap angle acquired in advance, outputs an output signal based on the map and controls the flap angle, and, further
- detects the flap angle having controlled based on the map, determines whether the detected flap angle is within a predetermined range of the target value of the map, and controls the flap angle.

5. An amphibious vehicle, comprising:
- a vehicle main body which can move on water and on land;
- a rear flap which is provided at a rear of the vehicle main body;
- a drive unit which drives the rear flap to change a flap angle between the vehicle main body and the rear flap;
- a detecting unit which detects a trim angle of the vehicle main body, a vehicle speed, and the flap angle; and
- a control unit which controls the flap angle based on the trim angle, the vehicle speed, and the flap angle detected by the detecting unit, wherein
- the controller detects an initial trim angle in a stationary state via the detecting unit, further has a map, that is prepared a plurality of curves corresponding to initial trim angles different from each other in advance, based on a relationship between the vehicle speed of the vehicle main body and an optimum angle of the flap angle, and
- selects an optimum curve of the vehicle speed and the flap angle corresponding to the detected initial trim angle from the plurality of the curves, using the detected initial trim angle, and controls the flap angle.

6. An amphibious vehicle, comprising:
- a vehicle main body which can move on water and on land;
- a rear flap which is provided at a rear of the vehicle main body;
- a drive unit which drives the rear flap to change a flap angle between the vehicle main body and the rear flap;
- a detecting unit which detects a trim angle of the vehicle main body, a vehicle speed, and the flap angle; and
- a control unit which controls the flap angle based on the trim angle, the vehicle speed, and the flap angle detected by the detecting unit, wherein
- the controller acquires, in advance, a relationship between the vehicle speed of the vehicle main body and an optimum angle of the trim angle, and
- has a function, which calculates an angle change command for controlling increase and decrease of the flap angle using an average relationship between a displacement amount of the trim angle and the displacement amount of the flap angle of the rear flap, acquired in advance.

* * * * *